Figure 5:
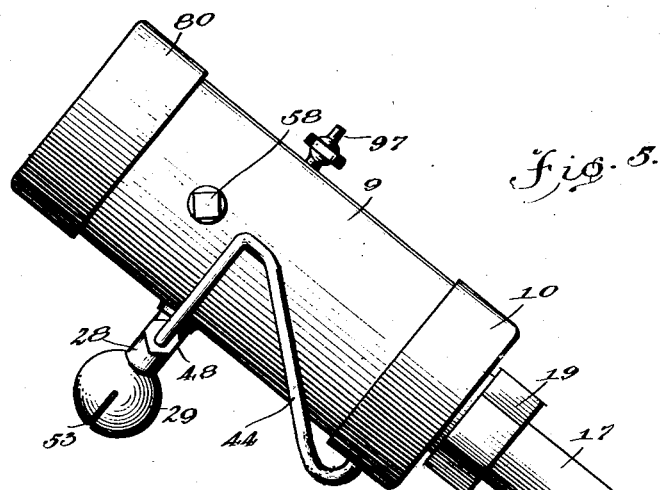

March 31, 1925.
H. HIDEN, JR
1,531,938
SPRING SUSPENSION FOR VEHICLES
Filed Nov. 2, 1923    2 Sheets-Sheet 1
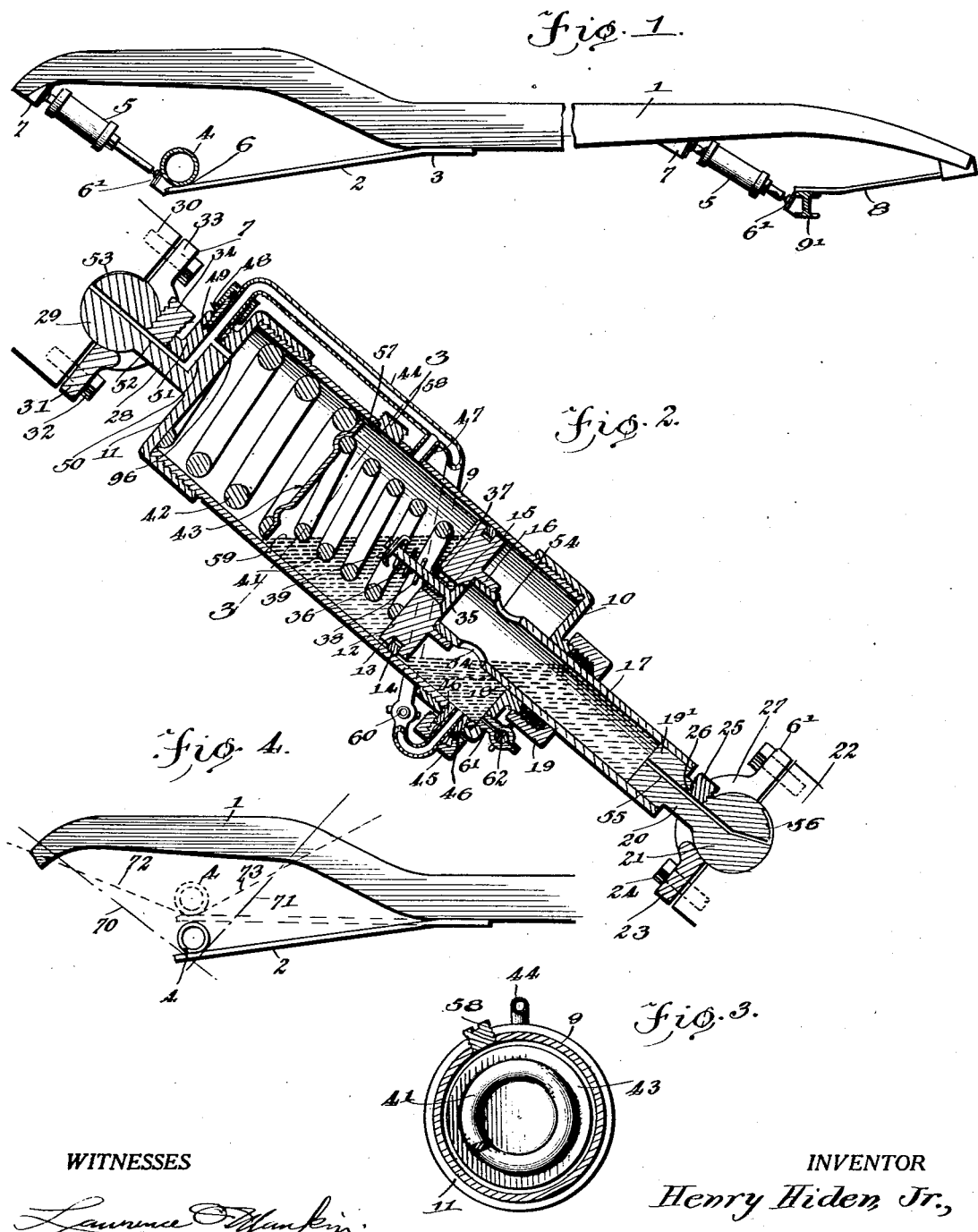
WITNESSES
INVENTOR
Henry Hiden, Jr.,
BY
ATTORNEYS March 31, 1925.

H. HIDEN, JR

SPRING SUSPENSION FOR VEHICLES

Filed Nov. 2, 1923

1,531,938

2 Sheets-Sheet 2

WITNESSES

INVENTOR
Henry Hiden Jr.,
BY
ATTORNEYS

Patented Mar. 31, 1925.

1,531,938

UNITED STATES PATENT OFFICE.

HENRY HIDEN, JR., OF BIRMINGHAM, ALABAMA.

SPRING SUSPENSION FOR VEHICLES.

Application filed November 2, 1923. Serial No. 672,394.

*To all whom it may concern:*

Be it known that I, HENRY HIDEN, Jr., a citizen of the United States, and a resident of Birmingham, in the county of Jefferson and State of Alabama, have made certain new and useful Improvements in Spring Suspensions for Vehicles, of which the following is a specification.

This invention relates to devices for supporting vehicle frames or bodies from their axles, and it consists in the combinations, constructions and arrangements herein described and claimed.

An object of the invention is to provide a suspension device of the character described which affords facilities for absorbing shocks and jars imparted thereto from the axles without transmitting such shocks and jars to the body or frame of the vehicle, and which also embodies means for resiliently supporting the frame or body of the vehicle from the axles without permitting jerky movements or sudden rebound of the frame or body when the suspension device is subjected to the usual stresses in actual service.

A further object of the invention is to provide a suspension device of the character described which embodies means adapted to be operated when the device is placed under stress to force a lubricant between the relatively moving parts of the device, whereby the wear on such parts will be slight and the operation of the device will be attended by very little if any noise.

Other objects and advantages will be apparent from the following description considered in conjunction with the accompanying drawings, in which:

Figure 1 is a longitudinal sectional elevation of a portion of the chassis of a vehicle, showing a practical embodiment of the invention arranged between each of the front and rear axles, and a side frame member of the chassis.

Figure 2 is a relatively enlarged fragmentary longitudinal section through a resilient cushioning arrangement, which is comprised in the spring suspension.

Figure 3 is a section along the line 3—3 of Fig. 2.

Figure 4 is a fragmentary sectional elevation of a portion of the structure shown in Fig. 1, the cushioning device being omitted and two possible positions of the cushioning device when under normal load being indicated by the dot and dash lines and the corresponding positions of the cushioning device when under a relatively heavy load occasioned by the stresses placed thereon when a shock has been transmitted thereto from the ground wheels, being indicated by the dotted lines.

Figure 5 is a side elevation of a modified form of resilient cushioning device.

Figure 6:
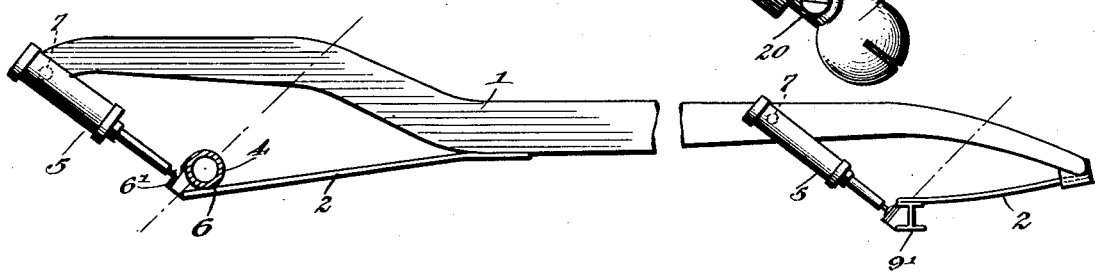
Figure 7:
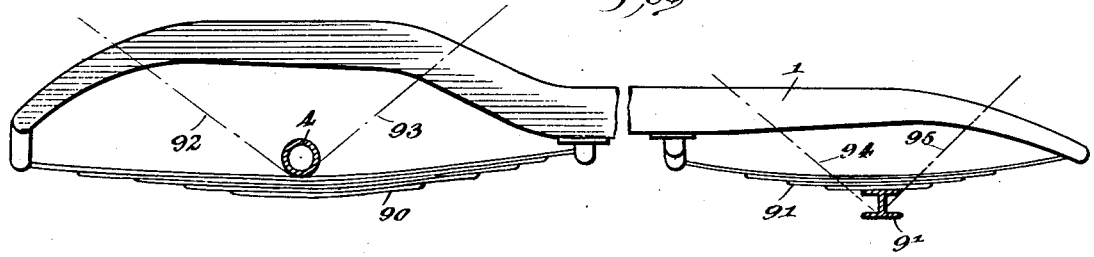

Figure 6 is a view similar to Fig. 1, showing the modified form of cushioning device applied, and, Figure 7 is a longitudinal sectional elevation through a portion of the vehicle chassis showing the axles attached to portions of the usual leaf springs, and showing in dot and dash lines two positions for each axle of either one of the cushioning devices exhibited respectively in Figs. 2 and 5 when such cushioning device is associated with said portions of the leaf springs and with a side frame member of the chassis.

Referring now to the drawings, and particularly to Fig. 1, thereof, the numeral 1 designates a side frame member of a chassis. The side frame member 1 may be of any suitable known construction. A bar 2 made of a material possessing inherent resiliency is attached at one end, as at 3, in any suitable known manner to the side frame member 1 at an appreciable distance from the rear end of the latter. The spring bar 2 is rigidly connected at 6 to the other end of the rear axle or axle housing 4, also in any suitably known manner. A resilient cushioning device which is designated generally at 5 is connected at one end by a ball and socket joint 6′ to the axle or axle housing 4 and is attached at its other end by ball and socket joint 7 to the side frame member 1 adjacent to the rear end of the latter.

Similarly, a spring bar 8 is attached at one end to the front axle 9′ and at its other end to the side frame member 1 at the forward end of the latter and one of the resilient cushioning devices 5 is arranged between the front axle and the side frame member, being connected by the ball and socket joint 6′ to the front axle and by the ball and socket joint 7 to the side frame member at an appreciable distance from the forward end of the latter. The cushioning device 5 is best seen in Figure 2 and comprises a cylinder 9 which is closed at one end by a screw cap 10, and at its opposite end by a cap 11, the cap to be screwed on cylinder or fastened to same in any other known manner. A piston 12 is reciprocable in the cylinder and is provided with a peripheral groove 13 in which is disposed a piston ring 14 so that the piston will move in fluid-tight engagement with the inner wall of the cylinder. The piston 12 has a central opening 15 formed therethrough, from one end of which extends a tubular boss 16, to which is fastened in any known manner a hollow piston rod 17. The latter extends slidably through a central opening 18 in the cap 10 and through a stuffing box 19, which is carried by the cap.

The hollow piston rod 17 is closed at its outer end by a plug 19' which is secured thereto in any suitably known manner, and which is provided integrally with an extension 20 extending beyond the outer end of the hollow piston rod and being fashioned at its extremity to provide a ball head 21 which forms a part of the ball and socket joint 6'.

The socket of the ball and socket joint 6' comprises a block portion 22 which may be secured to the axle or axle housing 4 in any suitable known manner, no means therefore being shown, and a cap 23 which may be secured to the block 22 by cap screws 24 or like fastening means, the block 22 and the cap 23 having complementary recesses in their confronting faces for the reception of the ball end portion of the extension 20. The ball member 21 is held against rotation in its socket about an axis extending longitudinally of the extension 20 by a threaded pin 25 which is engaged adjacent to its inner end in a threaded lateral opening at 26 in the extension 20 and which protrudes into a diametrical slot 27 in the cap 23.

The cap 11 is provided with an axial extension or boss 28 which extends outwardly therefrom and terminates in a rounded head or end portion 29 which constitutes the ball of the ball and socket joint 7. The socket of the ball and socket joint 7 comprises a block portion 30 which may be secured in any suitably known manner to the side frame member 1, and a cap 31 which cooperates with the block 30 and is secured thereto by cap screws 32 or the like, the cap 31 being provided with a diametrical slot 33 in which works the head or outer end portion of a stop screw 34, the latter being carried by the extension 28 in engagement with the side walls of the slot 33 to hold the ball member 29 against rotation about an axis alined with the longitudinal axis of the extension 28.

The central opening 15 through the piston 12 is enlarged at the end thereof proximate to the tubular boss 16 to provide a seat for a valve 35 having a stem 36 extending slidably through a spider frame 37 which is disposed within the opening 15 in concentric relation thereto and secured to the wall of the latter in any suitably known manner, or which may be integral therewith. The stem 36 is surrounded by a coiled expansion spring 38 which reacts at one end against the spider frame 37 and at its other end against a stop 39 carried by the stem 36 adjacent to its free end, whereby the valve 36 will be yieldingly held in closed position.

The piston 12 normally is held in the position shown in Fig. 2 by the joint action of expansion springs 41 and 42, respectively. The expansion springs 41 and 42 are coiled and are of different strengths, the convolutions thereof being of different diameters. The smaller of the two springs which in the present instance is the spring 41, is arranged within the cylinder with one end thereof pressing against the piston 12, while the other end reacts against a thrust plate 43 which separates the two expansion springs and holds them with the axes thereof in alinement. The thrust plate 43 is circular in configuration and of slightly less diameter than the inner diameter of the cylinder. The larger spring 42 reacts at one end against the thrust plate 43, and at its other end against the cap 11. A by-pass conduit 44 communicates at one end with the interior of the cylinder 9 adjacent to the end of the latter which is closed by the cap 10 on the under side thereof, being connected to the cylinder by a stuffing box 45 which includes a coupling member 46 in threaded engagement with alined lateral openings in the cylinder 9 and the flange portion of the cap 10 or connected in any other known manner. A branch 47 of the by-pass conduit communicates on the upper side of and with the interior of the cylinder intermediate the length of the latter and between the normal position of the piston and the cap 11 said connection to be in any known manner. The by-pass conduit extends alongside the cylinder towards the cap 11 and is connected to the extension 28 by a stuffing box 48 which includes a coupling 49 in threaded engagement with a bore 50, which extends into a lateral enlargement 51 of the extension 28 to the axial line of the latter and is then merged into an axial bore 52 which extends through the extension 28 and through the ball member 29 or the by-pass conduit may be connected to the extension 28 in any other suitable known manner. The axial bore 52 is in open communication at its outer end with a groove or channel 53 in the peripheral wall of the ball member. The hollow piston stem 17 is provided with lateral ports 54 in the portion thereof which is disposed within the cylinder to permit passage of air and oil into lower part of cylinder. The plug 19' has an axial bore 55 which extends through the ball member 21 and communicates at its outer end with a groove 56 in the peripheral wall of the ball member 21. A pet cock 97 which is shown in Figure 5 is screwed in the side of cylinder 9 communicating with the inside thereof and is placed at the proper level for the level of the oil or lubricant and is for the purpose of determining when the proper amount of oil is in the cylinder.

From the foregoing description of the various parts of the device the operation thereof may be readily understood. A lubricating liquid is supplied to the cylinder through a filler opening 57 until the cylinder has been partially filled therewith. The filler opening 57 normally is closed by a threaded plug 58. The liquid within the cylinder is indicated at 59 in Figure 2 in which the position of the piston when under normal load is illustrated. The cushioning device 5 for the rear axle then is in the position indicated by the dot and dash lines in Figure 4.

When the wheels of the vehicle strike an obstruction tending to move the axles relative to the frame or body, the force will be transmitted through the axles to the piston rod 17, tending to move the piston within the cylinder against the action of the springs 41 and 42. Since the springs 41 and 42 are of different strengths, relatively slight stresses will be overcome by the smaller spring 41 without any appreciable strain of the larger spring. As the load increases, both the springs will resist the attempted movement of the piston 12. When the piston moves within the cylinder against the action of the springs the valve 35 which is in effect a downwardly opening check valve, will be moved to open position against the action of the spring 38 and some of the lubricating liquid within the cylinder between the cap 11 and the piston will pass downwardly through the opening 15 into the lower part of the cylinder and through the hollow piston stem into the axial bore 55. Lubricant will be fed continuously through the bore 55 to the relatively moving surfaces of the ball member 21, and the socket therefor. When the stress occasioned by the increase of load is removed, the springs 41 and 42 will function to force the piston 12 downwardly in the cylinder and this movement will be resisted slightly by the lubricant within the lower part of the cylinder. The excess of lubricant within the lower part of the cylinder will be forced therefrom through the by-pass conduit 44. Some of this excess lubricant will return to the upper part of the cylinder through the branch 47 and some will pass in cylinder through opening 96 the size of openings 47 and 96 being such size as to permit surplus lubricant to pass through the lateral passage 50 into the bore 52 of the extension 28, and thence to the groove 53 and between the ball member 29 and its socket. A valve 60 may be provided for controlling the flow of lubricant through the by-pass conduit 44. A drain conduit 61 carried by the cap 10 may also be provided and may be controlled by valve 62.

As shown more or less diagrammatically in Fig. 4, the resilient cushioning device 5 may be disposed between the outer end of the spring bar 2 and the rear end of the side frame member 1, as indicated by one of the dot and dash lines. The dot and dash line denoting this position of the cushioning device is indicated at 70. If desired, the cushioning device 5 may be arranged to connect the outer end of the spring bar 2 to the side frame member 1, at a point forwardly of the rear extremity of the side frame member, as indicated at 71 by the second dot and dash line in Fig. 4. When the load is increased, the axle or axle housing 4 moves vertically from the full line position of Fig. 4 to the dotted line position, and the positions which would be assumed by the cushioning device 5 attached to the side frame member 1 in the positions just described and indicated at 70 and 71 will be as shown by the dotted lines and indicated at 72 and 73.

In Figure 5 I show a modified form of cushioning device which differs from that exhibited in Fig. 2 only in that the extension 28 is fastened to the side of the cylinder 9 instead of being part of cap 11. A plain cap 80 replaces the cap 11 of the form of device exhibited in Fig. 2. The remaining parts of the modification are identical in essential respects with the corresponding parts of the first form and it is thought that a description thereof is not necessary, like reference characters having been used to designate like parts of the two forms of the device.

In Fig. 6, I show the modified form of the device applied, the socket of the ball and socket joint 7 being arranged to extend laterally from the side frame member 1 instead of downwardly therefrom as shown in Fig. 1.

In Fig. 7, I show a further modification in which I make use of the upper sections 90 and 91 respectively of the usual front and rear leaf springs. These sections of the front and rear springs are attached at their ends in the usual manner to the side frame member 1 and the section of the rear leaf spring is attached intermediate its ends to the rear axle or axle housing 4, while the section of the front leaf spring likewise is attached intermediate its ends to the front axle 9'.

Two possible positions of either of the two forms of the cushioning device when arranged between the upper section of the rear spring 90 and the side frame member 1 are indicated by the dot and dash lines 92 and 93. Positions in which one of the cushioning devices may be disposed between the front axle 9' and the side frame member 1 are indicated by dot and dash lines 94 and 95 in Fig. 7.

Obviously my invention is susceptible of embodiment in forms other than illustrated in the accompanying drawings, and I therefore consider as my own all modifications and adaptations which fairly fall within the scope of the appended claims.

I claim:

1. In a suspension for vehicles, a cylinder, caps closing the cylinder at its opposite ends, an axial extension on one of said caps, said axial extension having a rounded outer end, the second of said caps having a central opening, a piston slidable in said cylinder and having a stem extending through the opening in the second cap, said piston stem being rounded at its outer end and having a passage for liquid opening at one end through the piston and at its other end through the rounded end portion of the piston stem, said extension being provided with a duct opening at one end through a lateral wall of the extension and at its other end through the rounded end of the extension, and a conduit connecting at one end with the lateral outlet of the duct of said extension and at its other end with the interior of the cylinder at a point beyond the limit of the stroke of the piston toward said second cap of the cylinder.

2. In a suspension for vehicles, a cylinder, caps closing the cylinder at its opposite ends, an axial extension on one of said caps, said axial extension having a rounded outer end, the second of said caps having a central opening, a piston slidable in said cylinder and having a stem extending through the opening in the second cap, said piston stem being rounded at its outer end and having a passage for liquid opening at one end through the piston and at its other end through the rounded end portion of the piston stem, said extension being provided with a duct opening at one end through a lateral wall of the extension and at its other end through the rounded end of the extension, and a conduit connecting at one end with the lateral outlet of the duct of said extension and at its other end with the interior of the cylinder at a point beyond the limit of the stroke of the piston toward said second cap of the cylinder, said rounded ends of the extension and the piston stem respectively being adapted to engage with a supporting socket and each having a groove in its outer wall in open communication with the passage which extends therethrough.

3. In a suspension for vehicles, a cylinder, caps closing the cylinder at its opposite ends, an axial extension on one of said caps, said axial extension having a rounded outer end, the second of said caps having a central opening, a piston slidable in said cylinder and having a stem extending through the opening in the second cap, said piston stem being rounded at its outer end and having a passage for liquid opening at one end through the piston and at its other end through the rounded end portion of the piston stem, said extension being provided with a duct opening at one end through a lateral wall of the extension and at its other end through the rounded end of the extension, a conduit connecting at one end with the lateral outlet of the duct of said extension and at its other end with the interior of the cylinder at a point beyond the limit of the stroke of the piston toward said second cap of the cylinder, said rounded ends of the extension and the piston stem respectively being adapted to engage with a supporting socket and each having a groove in its outer wall in open communication with the passage which extends therethrough, said passage in the piston stem communicating adjacent to its inner end with the interior of the cylinder, and a check valve opening toward the second cap of the cylinder and controlling the flow of liquid from the space between the first cap and the piston into the passage of the piston stem.

4. In a suspension for vehicles, a cylinder, caps closing the cylinder at its opposite ends, an axial extension on one of said caps, said axial extension having a rounded outer end, the second of said caps having a central opening, a piston slidable in said cylinder and having a stem extending through the opening in the second cap, said piston stem being rounded at its outer end and having a passage for liquid opening at one end through the piston and at its other end through the rounded end portion of the piston stem, said extension being provided with a duct opening at one end through a lateral wall of the extension and at its other end through the rounded end of the extension, a conduit connecting at one end with the lateral outlet of the duct of said extension and at its other end with the interior of the cylinder at a point beyond the limit of the stroke of the piston toward said second cap of the cylinder, said rounded ends of the extension and the piston stem respectively being adapted to engage with a supporting socket and each having a groove in its outer wall in open communication with the passage which extends therethrough, said passage in the piston stem communicating adjacent to its inner end with the interior of the cylinder, and a check valve opening toward the second cap of the cylinder and controlling the flow of liquid from the space between the first cap and the piston into the passage of the piston stem, said first cap having a passage establishing communication between said passage of the extension on the cap and the interior of the cylinder.

5. In a suspension for vehicles, a cylinder, caps closing the cylinder at its oposite ends, an axial extension on one of said caps, said axial extension having a rounded outer end, the second of said caps having a central opening, a piston slidable in said cylinder and having a stem extending through the opening in the second cap, said piston stem being rounded at its outer end and having a passage for liquid opening at one end through the piston and at its other end through the rounded end portion of the piston stem, said extension being provided with a duct opening at one end through a lateral wall of the extension and at its other end through the rounded end of the extension, and a conduit connecting at one end with the lateral outlet of the duct of said extension and at its other end with the interior of the cylinder at a point beyond the limit of the stroke of the piston toward said second cap of the cylinder, and expansion spring means between said piston and said first cap.

HENRY HIDEN, Jr.